United States Patent [19]

Wiggins et al.

[11] 4,439,161

[45] Mar. 27, 1984

[54] TAUGHT LEARNING AID

[75] Inventors: Richard H. Wiggins, Dallas; George Doddington, Richardson, both of Tex.; Craig J. Cato, Littleton, Colo.

[73] Assignee: Texas Instruments Incorporated, Dallas, Tex.

[21] Appl. No.: 301,090

[22] Filed: Sep. 11, 1981

[51] Int. Cl.³ ............................................. G09B 23/02
[52] U.S. Cl. ..................................... 434/201; 381/43; 381/51; 434/235
[58] Field of Search ......... 364/513; 179/1 SD, 1 SM; 434/319–321, 335, 201; 381/43, 51

[56] References Cited

U.S. PATENT DOCUMENTS

| | | | |
|---|---|---|---|
| 3,371,321 | 2/1968 | Adams | 179/1 SM |
| 4,078,316 | 3/1978 | Freeman | 434/319 |
| 4,117,605 | 10/1978 | Kurland et al. | 434/319 |
| 4,144,582 | 3/1979 | Hyatt | 179/1 SD |
| 4,189,779 | 2/1980 | Brautingham | 273/237 |

Primary Examiner—Vance Y. Hum
Assistant Examiner—Leo P. Picard
Attorney, Agent, or Firm—William E. Hiller; Leo N. Heiting; Melvin Sharp

[57] ABSTRACT

An electronic learning aid in which the student supplies a problem to which the learning aid supplies a response. The response of the learning aid is sometimes correct and at other times incorrect, thus requiring the operator/student to respond as an educator of the learning aid. This educating of the learning aid by the student requires the ability to recognize the correct answer. Preferably, if the student recognizes the correct response, praise is given; otherwise, either the problem is explained to the student or the learning aid ventures another guess. This "educating" of the learning aid through the posing of problems from the operator allows the student to proceed at his own pace and yet tries the limits of his knowledge.

16 Claims, 7 Drawing Figures

TAUGHT LEARNING AID

BACKGROUND

This invention relates to electronic learning aids and more specifically to musical learning aids.

Until recently electronic learning aids had not been recognized for their potential in instructing the beginning learner. In the past, the electronic aids have been used primarily at the upper educational levels to provide contact with electronics so as to generate a familiarity with their capabilities prior to the entry of the students into the job market.

More recently the electronic learning aids have been utilized at all age levels so as to provide an interactive environment in which the student paces himself and thereby encounters the to-be-learned material at a comfortable pace. Once the material has been adequately learned, to the satisfaction of the student, the student operator progresses to the next level of difficulty at his speed. This mode of operation eliminates the need for constant surveillance and monitoring by an educational instructor, and allows the student to interact with the material in a secure environment since he does not run the risk of peer pressure or instructor scrutiny.

The electronic learning aids have generally focused upon the reading, writing, and arithmetic sides of the learning process. Examples of these learning aids are the "Speak & Spell" TM electronic learning aid and the "Speak & Math" TM electronic learning aid, both manufactured by Texas Instruments Incorporated of Dallas, Tex. These devices audibly communicate to the operator a prompting message to which the operator responds via a keyboard. This response is analyzed as to its correctness relative to the prompting message and an appropriate set of instructions is then obtained; thereafter, the machine again audibly communicates to the operator either a positive reinforcement, when a correct answer has been given, or an informational message informing the operator of the correct answer. In this fashion the electronic learning aid has taken the place of the human instructor; a problem is given, a solution is attempted, and the solution is checked as to its accuracy. Advantages of the electronic learning aid are that it has an unlimited patience with the student and proceeds at a pace desired by the student.

The process of the student responding to a posed question establishes a good ability to respond to definite questions, but this technique alone does not create a depth of understanding. Similarly, a knowledge of reading, writing and arithmetic although necessary in the modern world, does not encompass other desirable skills; skills in the arts are equally important to develop.

DESCRIPTION OF THE INVENTION

The present electronic learning aid is comprised of a control means and operator interface. A problem to-be-solved is posed by the operator to which the learning aid responds. The response of the learning aid is sometimes incorrect requiring the operator to know and recognize the correct answer.

In the preferred embodiment, the operator generated problem is a sequence of pitches which the aid is to mimic.

Two primary modes of operation are used by the control means. The first mode of operation is for the control means to select a pitch, or a sequence of pitches, and to synthesize this pitch for the operator to hear. The operator responds by generating a mimic of the pitch; and the control means compares the operator's mimic with the synthesized pitch so as to reinforce the operator's tonal generation ability.

An alternative mode of operation is for the operator to generate a pitch or a sequence of pitches which are picked up by the means for identifying and communicated to the control means. The control means attempts to mimic the operator's pitch via the electronic synthesizing means. This mimic is reinforceable to the learning aid from the operator. In this mode of operation the operator/student is acting as an instructor to the electronic learning aid. The student poses a problem (whether it be a sequence of tones, or in an alternate embodiment an algebraic problem or the like) and the learning aid attempts an "answer". The learning aid, by allowing the answer to periodically be incorrect, forces the operator to be aware of the correct answer so as to catch the aid in its "mistake".

One of the necessary components of this electronic learning aid as is a means for identifying a pitch from a signal, typically analog. The analog signal is typically generated by the operator and either acts as a response to the prompting of the electronic learning aid or as a prompting for the electronic learning aid. This analog signal is optionally a signal pitch or contains a sequence of pitches such as a whistled tune.

Each tone contains a fundamental frequency establishing a pitch together with a durational component. A record of pitch with time duration uniquely identifies the tone. Similarly, a sequence of pitch and duration data defines a tone sequence or tune.

Numerous methods exist to extract from an analog signal the real time pitch or fundamental frequency of the signal. One such method is described by Joseph N. Maksym in his article "Real-Time Pitch Extraction by Adaptive Prediction of the Speech Waveform", *IEEE Transactions on Audio and Electroacoustics*, Vol. AU-21, NO.3, June 1973, incorporated hereinto by reference. The method described by Maksym operates by performing a short-term prediction of the analog speech. This short-term prediction generates a resultant prediction error so as to detect the presence of glottal excitation which is transformable into pitch frequency.

The pitch extractor or means for identifying a pitch communicates a signal to the control means which may be any one of numerous known data processors. One such data processor which serves this purpose is a TMS 1000 microprocessor available from Texas Instrument Incorporated of Dallas, Tex.

By monitoring the time between changes in the pitch, the control means establishes the time duration of the pitch so as to define the tone. Repeating this operation creates the sequence of tones in the tune.

The control means communicates with a means for electronically synthesizing a pitch. One such electronic synthesizer is described in U.S. Pat. No. 4,209,844 by Brantingham et al, issued on June 24, 1980 incorporated hereinto by reference. The Brantingham et al device utilizes what is referred to as a linear predictive filter in its synthesis of sounds such as speech signals. A speech synthesizer as described by Brantingham et al is also capable of generating various pitches through the manipulation of the so-called pitch parameters. Holding this pitch allows synthesis of the pitch for any duration so as to create the tonal qualities desired.

The speech synthesizer also allows an auditory channel between the control means and the operator to be created. In this fashion the microprocessor chooses an appropriate set of words from a library and communicates their parameters to the speech synthesizer so as to communicate an auditory message to the operator to act as either a prompting message or as a reinforcement message.

A second communication channel is preferably formed between the operator and the control means which is independent of the means for identifying a pitch. This communication channel is preferably a keyboard but optionally is comprised of analog voice recognition means.

Voice recognition is fully described by Edward R. Teja in his article "Voice Input and Output" appearing in Electronic Data News (EDN) Nov. 20, 1979, incorporated hereinto by reference. One method discussed by Teja is the use of a pulse-code-modulation scheme which then utilizes the encoded speech to map to a recognized vocal word.

The use of a keyboard for entry of data and response of the operator/student allows for efficient encoding of the response and totally distinguishes the two forms of input available to the operator, pitch input and keyboard input.

The performance of the hardware so described has two alternate modes. The first mode of operation is where the electronic learning aid performs as an instructor of the operator/student. The aid poses a question to the student in the form "Can you do this?" followed by a sequence of tones. The student responds by attempting to mimic the sequence; the aid matches the student's mimic to the generated sequence and either rewards, typically through praise, or corrects the response of the student.

The level of the complexity of the sequence is alterable through the use of plug in memories such as read only memories (ROM) or the like. The use of a ROM is beneficial since its storage is nonvolatile, thereby not requiring power. As the student/operator progresses, the addition of a more advanced ROM permits the aid to pose new and more difficult problems to the student operator.

The second mode of operation involves the operator/student formulating the problem and thereby "teaching" the aid. The operator poses a problem for the aid to solve. This problem is in the preferred embodiment a sequence of pitches defining an operator generated problem; an alternate embodiment is where the operator generated problem is algebraic or arithmetic in nature. The aid generates data in response to the operator generated problem. This response data is sometimes incorrect either through hardware limitations or through intentionally choosing an incorrect response by the aid. The operator/student evaluates the response data and enters his evaluation data of the response relative to the operator generated problem. The aid, by relating the operator generated problem, the response data of the aid, and the operator generated evaluation data, formulates either a new response or a message correcting the operator's evaluation.

An algebraic example of this interactive operation of the man-machine interface is:
Operator: "2+4−3=?"
Aid: "4"
Operator: "correct"
Aid: "No it isn't. The correct answer is 3. Do you agree?"

This type of interactive operation has a deeper influence on the learning of the operator since he is now forced to both create problems and to solve them whereas before his only requirement was to solve. Additionally, reinforcement of the operator's action is made through direct reinforcement and a subliminal satisfaction by the operator when he catches the aid in a "mistake".

The invention, together with embodiments thereof are more fully explained by the accompanying figures and their associated descriptions.

DRAWINGS IN BRIEF

Figure 6A:
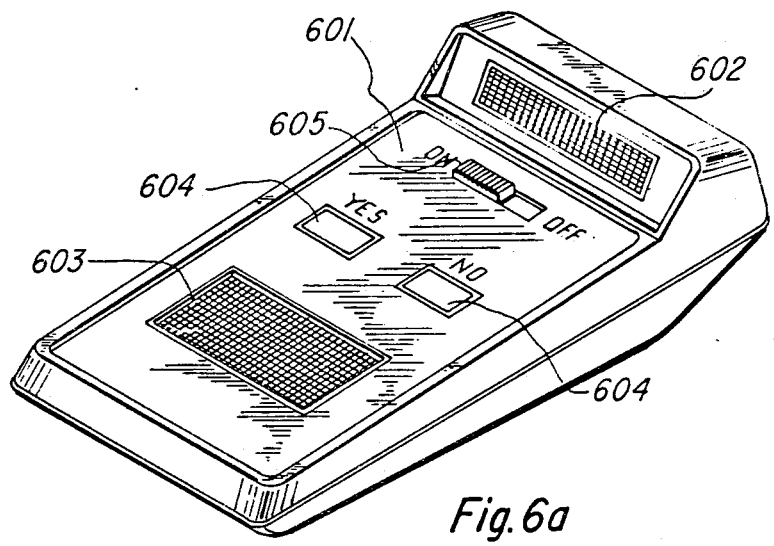
Figure 6B:

FIGS. 6a and 6b pictorially illustrate respective embodiments of the invention.

DRAWINGS IN DETAIL

Figure 1:
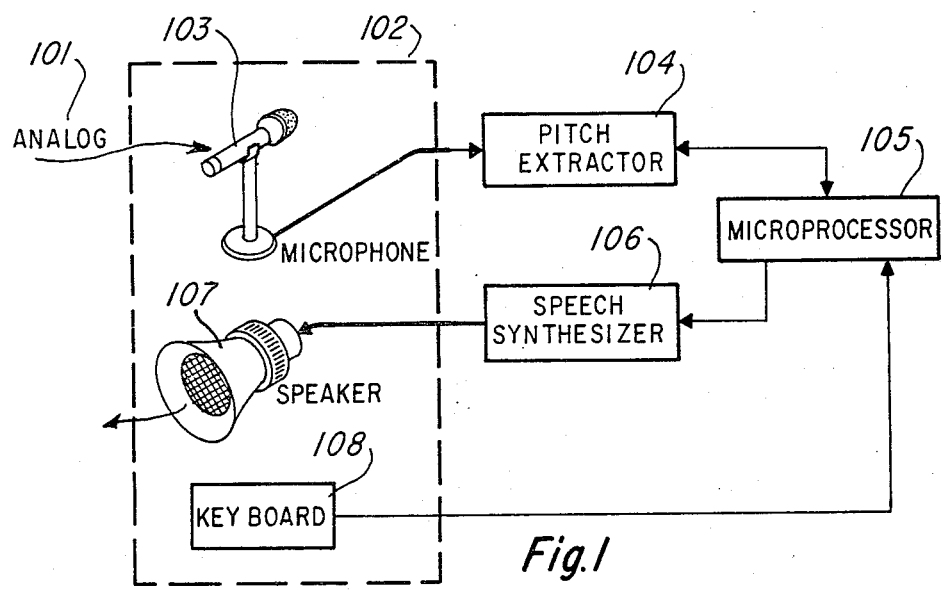
FIG. 1 is a block diagram of an embodiment of the electronic learning aid.

FIG. 1 is a block diagram of the operation of an embodiment of the invention.

An analog signal 101 is received by the microphone 103 and communicated to the pitch extractor 104. The pitch extractor 104 identifies the pitch of the analog signal 101 and communicates data representative of this pitch to the microprocessor 105.

The microprocessor 105 communicates a sequence of data representative of either words or tones to be synthesized to the speech synthesizer 106 which generates signals activating the speaker 107. In this fashion of generating data representative of either words or tones, the microprocessor 105 is able to communicate via the speech synthesizer 106 either a tone to an operator or a phrase indicative of either the status of the operation, a prompting message, or a reinforcing message. This provides an auditory channel to the operator/student.

The microphone 103 and speaker 107 are part of an operator interface 102. This operator interface 102 provides the channel by which the electronic learning aid is capable of communicating with the operator and vice versa. A keyboard 108 is optionally added to the operator interface 102 so as to provide another channel of communication with the microprocessor 105. Another option to the operator interface is the addition of a display means, not shown, which allows a visual representation of the pitches to be given and of messages. In this case, the display can substitute for the synthesizer 106 by illustrating in script form the tones.

The embodiment of FIG. 1 has the ability to change it mode of operation by selectively altering the microprocessor 105. One mode accepts a tone from the operator and attempts to mimic the operator's tone via the speech synthesizer 106. The operator is then prompted to respond by an audible voice signal from the microprocessor 105 via the speech synthesizer 106 in such a form as "Was that the proper tune?" For example, the operator responds via the keyboard 108 "yes" or again reiterates the tune. The mode of operation of the microprocessor 105 also allows the selection of a sequence of tones from the library and subsequent synthesization of the tones via the speech synthesizer 106. Thereafter the operator is prompted to mimic the tune via an auditory spoken message such as "Now you try it." The operator attempts a mimic sequence which is communicated via the pitch extractor 104 to the microprocessor 105 which compares the mimic received to the library sequence and responds to the operator via the speech synthesizer 106 with an appropriate message such as "No, your tune was off, try it again."

In this mode, the sequence of tones from the library is preferably randomly chosen so that a set pattern is avoided. This lack of repetition through random selection maintains the operator's interest since it is now impossible to predict the next tune.

Another operation allows the operator to pose a sequence of tones to the aid which then mimics the tonal sequence. The operator evaluates the aid's mimic and either praises or repeats the tonal sequence for the aid.

This interactive electronic learning aid has the ability in the first operational mode of being "taught" a tune by the operator. Although the electronics are not truly learning from this teaching method, they are assisting in the teaching of the operator since the operator must reiterate and utilize his perceptual ability when "teaching" the electronic learning aid.

Figure 2:
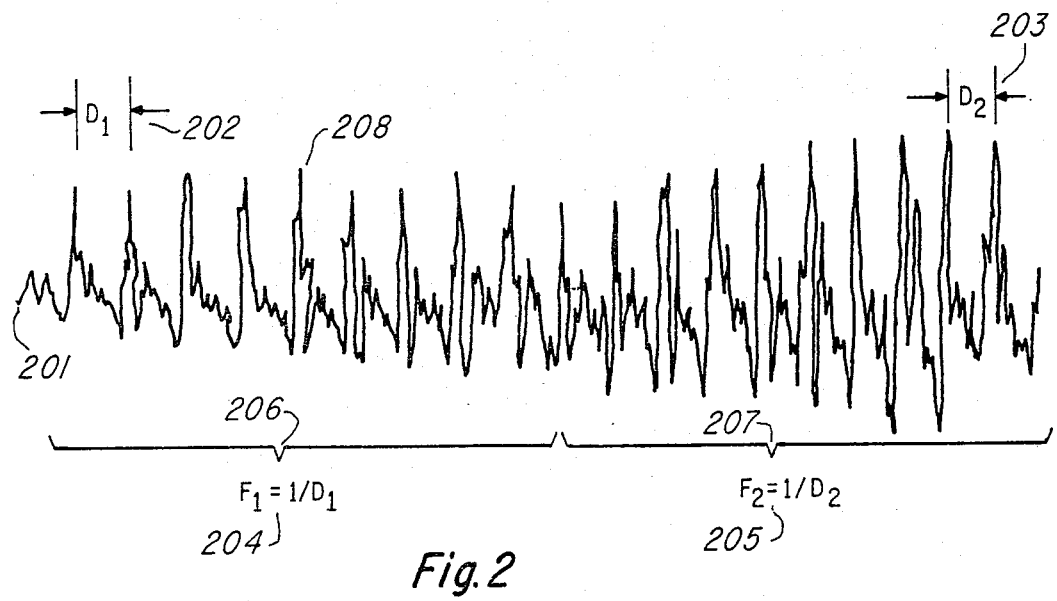
FIG. 2 illustrates the parameters extracted in the analysis of analog speech.

FIG. 2 illustrates the characteristics extracted from the analog speech signal for determination of the pitch given.

The analog signal 201 is comprised of sample frames 206 and 207 along with others not shown. The time duration of the sample frame is variable but preferably is approximately 20 milliseconds in duration. Each sample frame such as 206, has numerous peaks, such as 208, within its domain. The time intervals between the occurrences of such peaks, $d_1$, 202, and $d_2$, 203, are measured and averaged over the sample frame and a representative value is derived therefrom. The inverse of this representative value gives the frequency, $f_1$, 204, of the frame 206. In like fashion the frame 207 has a frequency $f_2$, 205.

The frequency of a set of frames maps distinctly into a particular pitch through numerous mapping methods including a least squares approximation so that the best match is made. The matching of the frequency to the pitch is made so as to minimize the error.

This process of determining the frequency and mapping to a pitch is performed for each frame within the sample. The sequence of pitches defines the operator pitch input.

Figure 3:
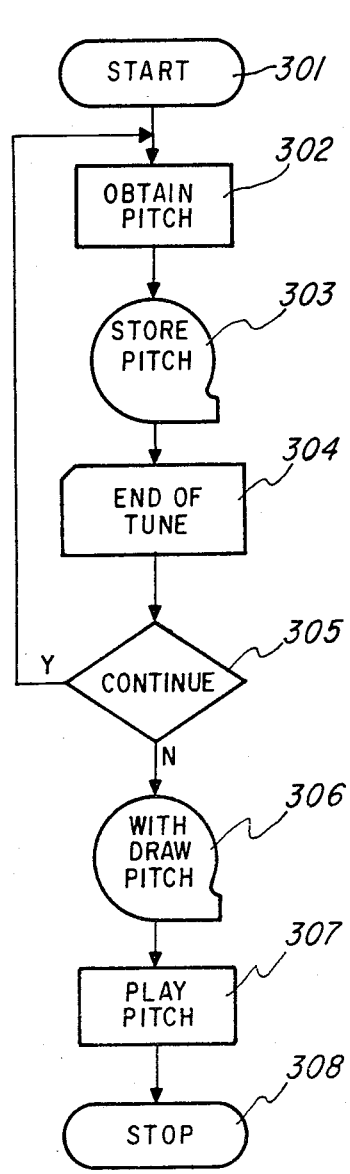
FIG. 3 is a flow chart of an operational mode of one embodiment of the invention.

FIG. 3 is a flow chart of the operation of a taught learning aid.

In this embodiment once the operation is initiated by the operator at the start, 301, the pitch of the operator input is obtained 302. The pitch, as obtained from the operator, is stored in some medium 303 and a scan is made of the keyboard or other input means, such as the detection of the end of tune by a simple energy detector, for the end of tune marker 304. Should an end-of-tune not be encountered, that is pitch detection should be continued, the operation returns to obtain another pitch from the user. If the operation is not to continue, 305, the sequence of pitches is recalled from memory 306 and reiterated or played back 307 to the operator.

In this mode the operator is "teaching" the learning aid a particular tune in which the learning aid receives the pitch sequence and stores it in memory for later play back to the operator. The operator/student is therefore capable of altering his tune, at his whim so as to generate the various pitches and thereby expand his capability.

Provision may be made to edit the sequence of tones so that the aid is "taught" a tune for playback for the enjoyment of the operator. In this case, 308 is replaced by a repeat on signal from the operator. In another embodiment, the aid is selectively requested to evaluate the tune and to generate a response based on the evaluation.

Figure 4:
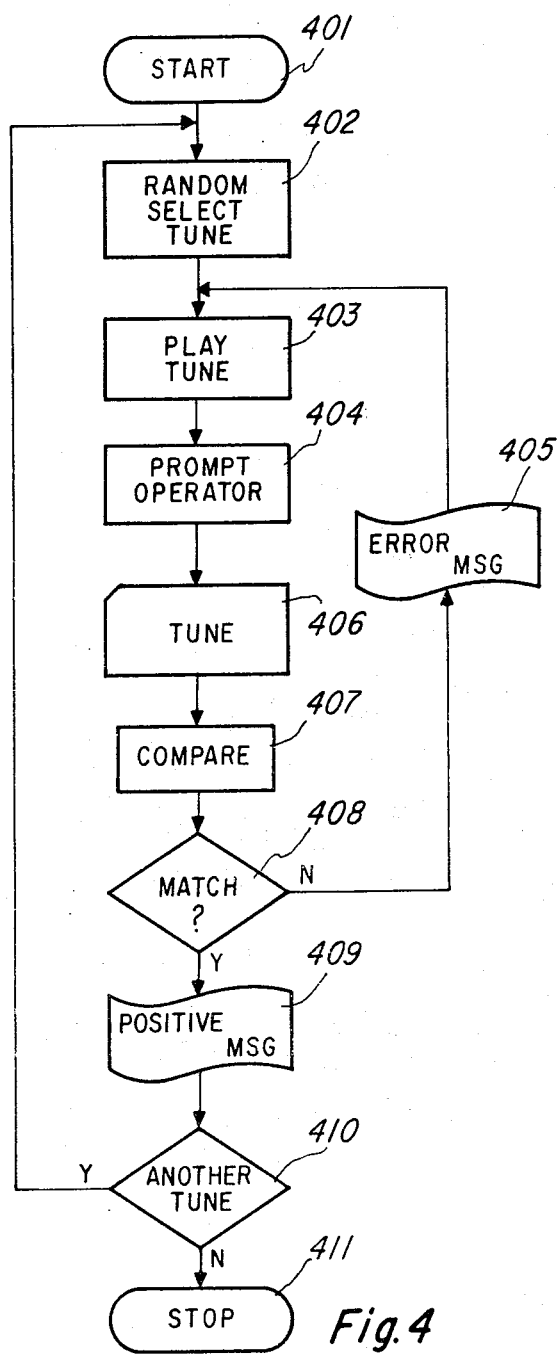
FIG. 4 is a flow chart of the teaching mode of the invention.

FIG. 4 is a flow chart of another embodiment of the operation of the learning aid.

The operation is initiated, 401, by the operator and a random tune is selected by the processor 402 from a library of prestored tunes. This tune is communicated 403 to the operator after which the operator is prompted 404, to attempt to mimic the tune generated. The tune generated by the operator is received, 406, and compared to the reference tune 407. The discrepancies between the received tune and the reference tune either generate an error message 405 or a match 408. If a match 408 occurs, a positive message 409 acting as reinforcement is given to the operator. The operator then selects if another tune 410 is to be given in which case the operation is repeated to 402; otherwise, the operation terminates, 411.

In this operational mode, the electronic learning aid generates a sequence of pitches which the operator is requested to mimic so as to learn pitches and tonal qualities during the mimic operation.

Figure 5:
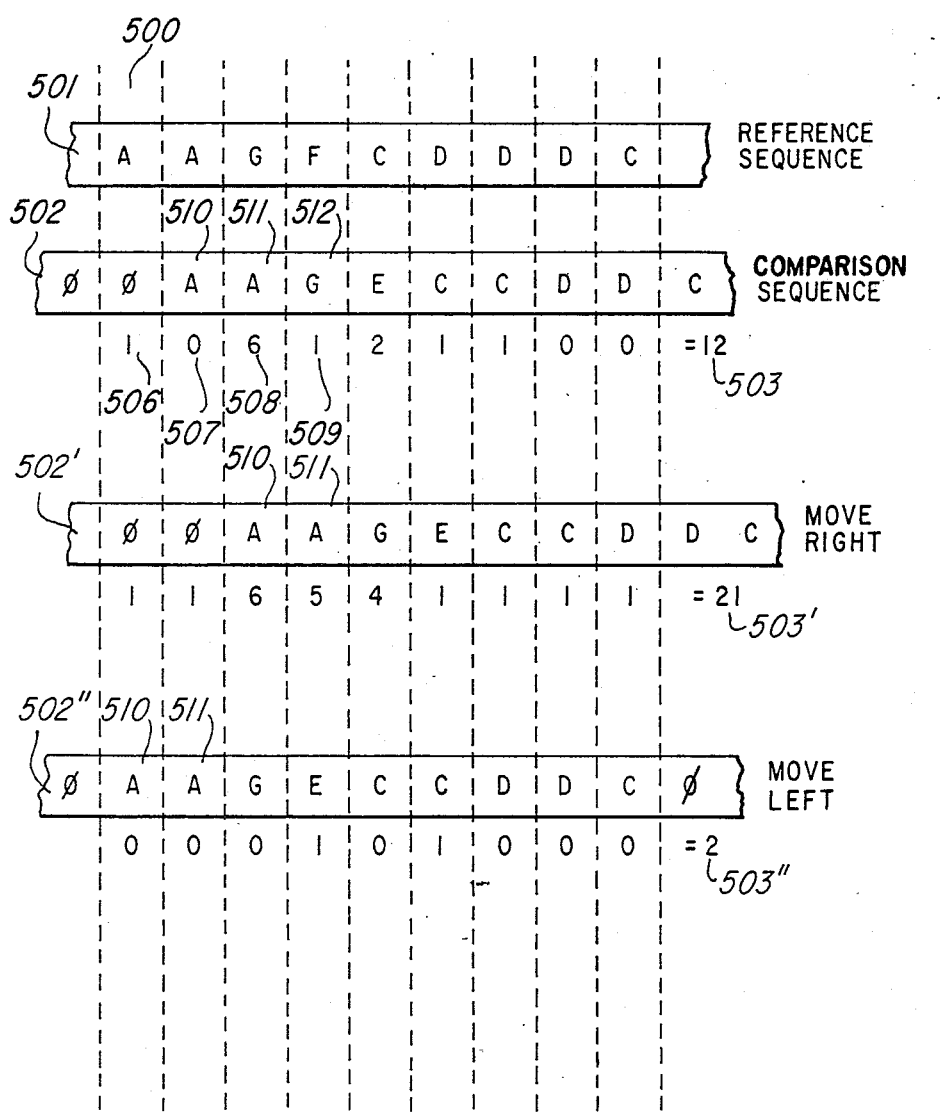
FIG. 5 illustrates a matching technique of the perceived pitches relative to the reference sequence for an embodiment of the invention.

FIG. 5 illustrates the matching of a reference sequence to the perceived or operator generated sequence.

The reference sequence 501 is comprised of a sequence of pitches such as 500 an "A". This sequence, as illustrated "A—A—G—F—C—D—D—D—C", is chosen from a library of reference sequences. The operator is prompted to respond, as indicated in FIG. 4 and generates a sequence of tones 502. This sequence 502 is compared, frame for frame, with the reference sequence 501 and each frame generates a comparison value such as 506, 507, 508, and 509. The summation of the comparison values yields a match value 503.

The received sequence is moved to the right, 502', and again frame for frame the reference sequence is compared to the operator generated sequence and again yields a match value 503'.

Since each frame is of a relatively short duration, the duration is appropriately reflected. Hence pitches 510 and 511 establish a tone of "A" which is twice as long as the pitch 512 for "G".

The operator generated sequence, is moved to the left, 502'', and the sequence is compared to the reference sequence again frame for frame. This alteration yields a match value, 503''. The movement of the operator generated sequence relative to the reference sequence is performed a number of times and the optimal match value is chosen. In this example, the optimal match value is 503'' yielding a value of 2.

FIG. 6a pictorially illustrates a hand-held embodiment of the invention.

In this embodiment the electronic learning aid is in a single package 601 which contains all elements necessary for its operation. Optionally, plug in cartridges may be added, not shown, so as to expand the repertoire of sequences available in the learning aid. The learning aid, 601, is activated via a switch 605 so that the aid 601 communicates to the operator via a speaker 603. The operator is given a menu of choices in which he responds via a yes/no switch 604. Microphone 602 allows the aid 601 to receive the pitches generated by the operator/student.

FIG. 6b is another embodiment of the invention encased in a doll.

A doll is a companion type embodiment which encourages the young operator to interface with it since it is friendly. In this embodiment, speaker 603' communicates the tones to the child operator.

This invention allows the interplay and the transformation of the operator from a student responding only to posed questions to a teaching mode in the musical environment. The student optionally either teaches the aid or learns from the aid particular sequences either chosen by the aid or chosen by the student.

What is claimed is:

1. A learning aid comprising:
    control means having defined therein a response data set and a set of messages, said control means having
        means for selecting a first response data from said set of response data in response to an operator generated problem, and for selecting a second response data from said set of response data in response to an operator generated evaluation input,
        memory means for storage of said response data set;
    said means for selecting a first response data including means for randomly choosing an incorrect response data from said response data set as said first response;
    said means for selecting a second particular response data including means for evaluating if said first response data is appropriate with said operator generated problem; and
    operator interface means communicating with said control means, said operator interface means having
        means for receiving said operator generated problem, for receiving said operator generated evaluation data, and for communicating to the operator said first response data and said second response data.

2. The learning aid according to claim 1 wherein said control means includes means for forming a sequence of messages from said set of messages and further comprised of means for communicating said sequence of messages to the operator.

3. The learning aid according to claim 1 wherein said control means includes means for selectively activating said means for randomly choosing an incorrect response data.

4. The learning aid according to claim 1 wherein said means for receiving said operator generated problem includes voice input means.

5. The learning aid according to claim 4 wherein said voice input means includes pitch recognition means.

6. The learning aid according to claim 5 wherein said means for receiving said operator generated evaluation data includes a keyboard.

7. The learning aid according to claim 6 wherein said means for communicating to the operator said first response data includes voice synthesis means.

8. The learning aid according to claim 7 wherein said operator interface means includes means to communicate to the operator said randomly chosen incorrect response data in a human language via said voice synthesis means.

9. The learning aid according to claim 7 wherein said voice synthesis means includes means for generating a pitch.

10. A method of operating a learning aid comprising:
    receiving an operator generated problem via an operator interface;
    selecting a first response to said operator generated problem from a library of responses;
    periodically choosing in selecting said first response to said operator generated problem from a library of responses a first response which is not optimally related to said operator generated problem;
    communicating said first response to said operator;
    receiving via said operator interface, an operator generated evaluation input;
    generating a decisional data based on the relationship of said operator generated problem, said first response, and said operator generated evaluation input; and
    communicating said decisional data to the operator via said operator interface.

11. The method of operating a learning aid according to claim 10, wherein the generation of a decisional data includes:
    comparing said operator generated problem and said first response and generating therefrom a falsity decision data;
    comparing said operator generated evaluation input with said falsity decision data and generating therefrom a correctness data; and
    choosing, based on said correctness data, either a second response data or a message data as said decisional data.

12. The method of operating a learning aid according to claim 11 wherein the communication of said decisional data includes electronically synthesizing an auditory signal representative of said decisional data.

13. The method of operating a learning aid according to claim 12, wherein the reception of an operator generated problem includes:
    translating an operator generated auditory signal into electronic signals;
    extracting a sequence of pitches from said electronic signals; and
    translating said sequence of pitches into an operator generated problem.

14. A man-machine interactive system comprising:
    problem input means for receipt of a operator generated problem, said problem input means including means for translating an operator generated auditory signal into a sequence of pitches as the operator generated problem;
    response generation means for selecting a first data value in response to said operator generated problem, said response generation means including means for selecting a non-optimal match between said sequence of pitches and a library of pitches in forming said first data value;
    output means including a voice synthesis means for communicating to said operator said first data value;
    judgment input means including a keyboard for receipt of an operator generated judgment data;
    decisional means for generating decisional data being either a second data value or a message according to a relationship of said operator generated problem, said first data value, and said operator generated judgment data; and communication means for transmission of said decisional data to said operator.

15. The man-machine interactive system according to claim 14 wherein said means for selecting a non-optimal match is selectively activated by said response generation means.

16. A man-machine interactive system comprising:
problem input means for receipt of an operator generated problem in the form of an algebraic equation;
response generation means for selecting a first data value in response to said operator generated problem, said response generation means including means for selecting a non-optimal match between the correct answer for the algebraic equation and a library of response in forming said first data value;
output means including a voice synthesis means for communicating to said operator said first data value;
judgment input means including a keyboard for receipt of an operator generated judgment data;
decisional means for generating decisional data being either a second data value or a message according to a relationship of said operator generated problem, said first data value, and said operator generated judgment data; and
communication means for transmission of said decisional data to said operator.

* * * * *